(12) United States Patent
Peled et al.

(10) Patent No.: US 10,476,076 B2
(45) Date of Patent: Nov. 12, 2019

(54) ANODE COMPOSITIONS AND ALKALI METAL BATTERIES COMPRISING SAME

(71) Applicant: RAMOT AT TEL-AVIV UNIVERSITY LTD., Tel-Aviv (IL)

(72) Inventors: Emanuel Peled, Even Yehuda (IL); Diana Golodnitsky, Rishon-LeZion (IL); Kathrin Freedman, Zoran (IL); Keren Goldshtein, Rehovot (IL); Meital Alon, Tel-Aviv (IL)

(73) Assignee: Ramot at Tel-Aviv University Ltd., Tel-Aviv (IL)

(*) Notice: Subject to any disclaimer, the term of this patent is extended or adjusted under 35 U.S.C. 154(b) by 466 days.

(21) Appl. No.: 15/115,947

(22) PCT Filed: Feb. 3, 2015

(86) PCT No.: PCT/IL2015/050120
§ 371 (c)(1),
(2) Date: Aug. 2, 2016

(87) PCT Pub. No.: WO2015/114640
PCT Pub. Date: Aug. 6, 2015

(65) Prior Publication Data
US 2017/0170473 A1    Jun. 15, 2017

Related U.S. Application Data

(60) Provisional application No. 61/934,923, filed on Feb. 3, 2014.

(51) Int. Cl.
*H01M 4/40* (2006.01)
*H01M 4/134* (2010.01)
(Continued)

(52) U.S. Cl.
CPC .......... *H01M 4/405* (2013.01); *H01M 4/134* (2013.01); *H01M 4/366* (2013.01); *H01M 4/386* (2013.01);
(Continued)

(58) Field of Classification Search
CPC ...... H01M 4/405; H01M 4/134; H01M 4/366; H01M 4/386; H01M 4/46; H01M 4/485; H01M 4/505; H01M 4/525; H01M 4/5825
See application file for complete search history.

(56) References Cited

U.S. PATENT DOCUMENTS

| 6,210,832 B1 | 4/2001 | Visco et al. |
| 6,908,706 B2 | 6/2005 | Choi et al. |

(Continued)

FOREIGN PATENT DOCUMENTS

| JP | 2003-059492 | 2/2003 |
| WO | WO 2010/059749 | 5/2010 |

(Continued)

OTHER PUBLICATIONS

Restriction Official Action dated May 14, 2018 From the US Patent and Trademark Office Re. U.S. Appl. No. 15/115,935. (9 pages).
(Continued)

*Primary Examiner* — Helen Oi K Conley

(57) ABSTRACT

A composition-of-matter comprising a plurality of particles is disclosed herein, the particles comprising a compound (e.g., an element or a mixture of elements) which forms an alloy with an alkali metal and/or an alloy of an alkali metal with said compound. The alloy is characterized by reversibly releasing the alkali metal and absorbing the alkali metal. Some or all of the particles are encapsulated within a volume enclosed by a shell or matrix which conducts cations of the alkali metal, wherein a volume of the alloy upon maximal
(Continued)

absorption of the alkali metal does not exceed the volume enclosed by a shell or matrix. Further disclosed herein is a process of preparing a composition-of-matter, which is effected by coating particles comprising an alloy saturated with the alkali metal with a conductor of cations of the alkali metal, as well as electrochemical half cells and batteries including the composition-of-matter.

20 Claims, 5 Drawing Sheets

(51) Int. Cl.
| | |
|---|---|
| H01M 4/36 | (2006.01) |
| H01M 4/38 | (2006.01) |
| H01M 4/46 | (2006.01) |
| H01M 4/485 | (2010.01) |
| H01M 4/505 | (2010.01) |
| H01M 4/525 | (2010.01) |
| H01M 4/58 | (2010.01) |
| H01M 10/0525 | (2010.01) |
| H01M 4/02 | (2006.01) |

(52) U.S. Cl.
CPC ............ *H01M 4/387* (2013.01); *H01M 4/46* (2013.01); *H01M 4/485* (2013.01); *H01M 4/505* (2013.01); *H01M 4/525* (2013.01); *H01M 4/5825* (2013.01); *H01M 10/0525* (2013.01); *H01M 2004/027* (2013.01)

(56) References Cited

U.S. PATENT DOCUMENTS

| | | | |
|---|---|---|---|
| 7,087,348 | B2 | 8/2006 | Holman et al. |
| 8,057,900 | B2 | 11/2011 | Luhrs et al. |
| 2004/0234859 | A1 | 11/2004 | Lee et al. |
| 2006/0057463 | A1 | 3/2006 | Gao et al. |
| 2010/0173198 | A1 | 7/2010 | Zhamiu et al. |
| 2011/0052998 | A1 | 3/2011 | Liang et al. |
| 2012/0202112 | A1 | 8/2012 | Yushin et al. |
| 2013/0065127 | A1 | 3/2013 | Nazar et al. |
| 2013/0065128 | A1 | 3/2013 | Li et al. |
| 2013/0164620 | A1 | 6/2013 | Woo et al. |
| 2013/0295469 | A1 | 11/2013 | Liang et al. |
| 2013/0344391 | A1 | 12/2013 | Yushin et al. |
| 2014/0356721 | A1 | 12/2014 | Zhou et al. |
| 2017/0162864 | A1 | 6/2017 | Peled et al. |

FOREIGN PATENT DOCUMENTS

| | | |
|---|---|---|
| WO | WO 2010/080547 | 7/2010 |
| WO | WO 2010/101936 | 9/2010 |
| WO | WO 2012/054766 | 4/2012 |
| WO | WO 2015/114639 | 8/2015 |
| WO | WO 2015/114640 | 8/2015 |

OTHER PUBLICATIONS

International Preliminary Report on Patentability dated Aug. 18, 2016 From the International Bureau of WIPO Re. Application No. PCT/IL2015/050120.
International Preliminary Report on Patentability dated Aug. 18, 2016 From the International Bureau of WIPO Re. Application No. PCT/IL2015/050119.
International Search Report and the Written Opinion dated Jul. 1, 2015 From the International Searching Authority Re. Application No. PCT/IL2015/050119.
International Search Report and the Written Opinion dated Jul. 2, 2015 From the International Searching Authority Re. Application No. PCT/IL2015/050120.
Guo et al. "Lithium-Sulfur Battery Cathode Enabled by Lithium-Nitrile Interaction", Journal of the American Chemical Society, JACS, 135: 763-767, Dec. 12, 2012.
Ji et al. "A Highly Ordered Nanostructered Carbon-Sulphur Cathode for Lithium-Sulphur Batteries", Nature Materials, 8: 500-506, Jun. 2009.
Li et al. "High-Performance Hollow Sulfur Nanostructured Battery Cathode Through a Scalable, Room Temperature, One-Step, Bottom-Up Approach", Proceedings of the National Academy of Sciences, 110(18): 7148-7153, Apr. 30, 2013.
Lin et al. "Lithium Superionic Sulfide Cathode for All-Solid Lithium-Sulfur Batteries", ACS Nano, 7(3): 2829-2833, Published Online Feb. 22, 2013.
Liu et al. "A Yolk-Shell Design for Stabilized and Scalable Li-Ion Battery Alloy Anodes", Nano Letters, 12: 3315-3321, May 2, 2012.
Peled "The Electrochemical Behavior of Alkali and Alkaline Earth Metals in Nonaqueous Battery Systems—The Solid Electrolyte Interphase Model", Journal of the Electrochemical Society: Electrochemical Science and Technology, 126(12): 2047-2051, Dec. 1979.
Peled et al. "Lithium-Sulfur Battery: Evaluation of Dioxolane-Based Electrolytes", Journal of the Electrochemical Society, 136(6): 1621-1625, Jun. 1989.
Seh et al. "Sulphur-TiO2 Yolk-Shell Nanoarchitecture With Internal Void Space for Long-Cycle Lithium-Sulphur Batteries", Nature Communications, 4(1331): 1-6, Jan. 8, 2013.
Wu et al. "Soft Template Synthesis of Yolk/Silica Shell Particles", Advanced Materials, 22: 1516-1520, 2010.
Yamin et al. "Lithium Sulfur Battery. Oxidation/Reduction Mechanisms of Polysulfides in THF Solutions", Journal of the Electrochemical Society: Electrochemical Science and Technology, 135(5) 1045-1048, May 1988.
Yang et al. "High-Capacity Micrometer-Sized Li2S Particles as Cathode Materials for Advanced Rechargeable Lithium-Ion Batteries", Journal of the American Chemical Society, 134 (37): 15387-15394, Aug. 21, 2012.
Zhou et al. "Yolk-Shell Structure of Polyaniline-Coated Sulfur for Lithium-Sulfur Batteries", ACS Nano, 135(44): 16736-16743, Oct. 10, 2013.
Supplementary European Search Report and the European Search Opinion dated Jun. 30, 2017 From the European Patent Office Re. Application No. 15742677.6. (11 Pages).
Liu et al. "Anomalous High Ionic Conductivity of Nanoporous [Beta]-Li3PS4", Journal of the American Chemical Society, JACS, XP055330622, 135(3): 975-978, Jan. 10, 2013. p. 977.
Liu et al. "Anomalous High Ionic Conductivity of Nanoporous [Beta]-Li3PS4", Journal of the American Chemical Society, JACS, XP055381673, Suppl.: S1-S8, Jan. 23, 2013. Para [Methods].
Supplementary European Search Report and the European Search Opinion dated Jun. 14, 2017 From the European Patent Office Re. Application No. 15743315.2. (9 Pages).
Official Action dated Sep. 21, 2018 From the US Patent and Trademark Office Re. U.S. Appl. No. 15/115,935. (20 Pages).
Applicant-Initiated Interview Summary dated Jun. 11, 2019 From the US Patent and Trademark Office Re. U.S. Appl. No. 15/115,935. (3 Pages).
Official Action dated Mar. 18, 2019 From the US Patent and Trademark Office Re. U.S. Appl. No. 15/115,935. (19 pages).

ANODE COMPOSITIONS AND ALKALI METAL BATTERIES COMPRISING SAME

FIELD AND BACKGROUND OF THE INVENTION

The present invention, in some embodiments thereof, relates to electrochemistry and more particularly, but not exclusively, to compositions comprising an alkali metal alloy which can be used in an electrode of an alkali metal battery.

In alkali metal ion batteries, the alkali metal (usually lithium) undergoes insertion or intercalation into a suitable material, such as an alloy or graphite. The alkali metal enters the anode structure during charge and exits during discharge. The alkali metal anode is typically protected by a solid electrolyte interphase (SEI) comprising salts of the alkali metal [Peled, *J Electrochem Soc* 1979, 126:2047-2051].

Graphite has been widely used as anode material in lithium ion batteries. In the fully charged state, its potential is very close to that of metallic lithium. This leads to possible problems with high-rate charging, such as in regenerative braking of hybrid electric vehicles (HEVs), especially at low ambient temperatures. In such circumstances, the lithium may form dendrite (needle-like) deposits on the surface of the graphite anode, which may penetrate the separator, short the battery, melt and cause a thermal runaway situation. In addition, a graphite intercalation anode has low gravimetric and volumetric energy densities, about 370 ampere hours per kg and 770 ampere hours per liter, compared to 3,800 ampere hours per kg for pure lithium.

Aluminum, tin and silicon each form lithium-rich alloys with high melting points and energy densities, e.g., $Li_{4.4}Sn$ (992 ampere hours per kg) and $Li_{4.4}Si$ (3,600 ampere hours per kg). However, the very large volume changes during the lithium intercalation-de-intercalation processes (over 300% for a silicon anode) lead to fast anode disintegration which severely limits extended deep cycling, thereby restraining practical application of such anodes. Attempts to reduce the volume change and disintegration by coating the silicon particles with a thin carbon film have not solved this problem, as the silicon particles expand upon lithiation (battery charge) and break the carbon shell.

U.S. Patent Application Publication No. 2013/0344391 describes battery electrode compositions comprising core-shell composites with a shell substantially permeable to metal ions, an active material such as silicon for storing and releasing metal ions, and a collapsible core (e.g., porous carbon material) and/or an internal void for accommodating changes in volume of the active material.

Liu et al. [*Nano Lett* 2012, 12:3315-3321] describes silicon nanoparticles inside of thin, self supporting carbon shells with a rationally designed void space between the particles and the shell, for use in a silicon electrode for lithium ion batteries. Voids were generated by using HF etching to remove $SiO_2$ from partially oxidized silicon inside the carbon shell.

Wu & Xu [*Adv Mater* 2010: 22:1516-1520] describe a method of producing hollow silica spheres incorporated with different particles independent of their diameters, geometry and composition. Lithium ion batteries are described as a potential application for such particles.

Additional background art includes U.S. Pat. No. 6,908,706; U.S. Patent Application Publication No. 2011/0052998; U.S. Patent Application Publication No. 2013/0065128; U.S. Patent Application Publication No. 2013/0164620; Guo et al. [*JACS* 2013, 135:763-767]; Ji et al. [*Nature Mater* 2009, 8:500-506]; Peled et al. [*J Electrochem Soc* 1989, 136:1621-1625]; Seh et al. [*Nature Commun* 2013, 4:1331]; and Yamin et al. [*J Electrochem Soc* 1988, 135:1045-1048].

SUMMARY OF THE INVENTION

According to an aspect of some embodiments of the invention, there is provided a process of preparing a composition-of-matter comprising a plurality of particles, the particles comprising a substance selected from the group consisting of:

a) a compound which forms an alloy with an alkali metal; and b) an alloy of an alkali metal with the compound, the alloy reversibly releasing the alkali metal while decreasing in volume and absorbing the alkali metal while increasing in volume, wherein each of the particles is encapsulated within a volume enclosed by a shell or matrix which conducts cations of the alkali metal, the process comprising:

i) providing particles comprising the alloy of an alkali metal with the compound, wherein the alloy is saturated with the alkali metal; and ii) coating the particles with a conductor of cations of the alkali metal, thereby forming the shell or matrix.

According to an aspect of some embodiments of the invention, there is provided a process of preparing a composition-of-matter comprising a plurality of particles, the particles comprising a substance selected from the group consisting of silicon, tin, antimony, germanium, lead, bismuth, magnesium, aluminum, mixtures thereof, and alloys thereof with lithium, wherein each of the particles is encapsulated within a volume enclosed by a shell or matrix which conducts lithium cations, the process comprising:

i) providing particles comprising an alloy of lithium with a substance selected from the group consisting of silicon, tin, antimony, germanium, lead, bismuth, magnesium, aluminum, and mixtures thereof, wherein the alloy is saturated with lithium; and ii) coating the particles with a conductor of lithium cations, thereby forming the shell or matrix.

According to an aspect of some embodiments of the invention, there is provided a composition-of-matter prepared according to a process described herein.

According to an aspect of some embodiments of the invention, there is provided a composition-of-matter comprising a plurality of particles, the particles comprising a substance selected from the group consisting of:

a) a compound which forms an alloy with an alkali metal; and b) an alloy of an alkali metal with the compound, the alloy reversibly releasing the alkali metal while decreasing in volume and absorbing the alkali metal while increasing in volume, wherein each of the particles is encapsulated within a volume enclosed by a shell or matrix which conducts cations of the alkali metal, wherein a volume of the alloy upon maximal absorption of the alkali metal does not exceed the volume enclosed by a shell or matrix.

According to an aspect of some embodiments of the invention, there is provided a composition-of-matter comprising a plurality of particles, the particles comprising a substance selected from the group consisting of silicon, tin, antimony, germanium, lead, bismuth, magnesium, aluminum, mixtures thereof, and alloys thereof with lithium, wherein each of the particles is encapsulated within a volume enclosed by a shell or matrix which conducts lithium cations, wherein a volume of an alloy formed upon saturation of the substance by lithium does not exceed the volume enclosed by a shell or matrix.

According to an aspect of some embodiments of the invention, there is provided an electrochemical half cell comprising an anode which comprises a composition-of-matter described herein, and a liquid comprising an electrolyte.

According to some of any of the embodiments of the invention relating to an electrochemical half cell, the shell or matrix which conducts cations of the alkali metal is insoluble in the liquid comprising an electrolyte.

According to some of any of the embodiments of the invention relating to an electrochemical half cell, the composition-of-matter is in a form of a powder, and the powder is attached by a binder to a current collector.

According to some of any of the embodiments of the invention relating to an electrochemical half cell, the powder is attached by a binder to a current collector in combination with carbon powder.

According to an aspect of some embodiments of the invention, there is provided a rechargeable alkali metal ion battery comprising an electrochemical half cell described herein and an alkali metal ion cathode.

According to some of any of the embodiments of the invention, the alkali metal is lithium and the cathode comprises a lithium-containing substance selected from the group consisting of lithium iron phosphate, lithium cobalt oxide, lithium nickel oxide, lithium manganese oxide, lithium nickel manganese cobalt oxide, lithium nickel cobalt aluminum oxide and lithium titanate.

According to some of any of the embodiments of the invention relating to a battery, when a cathode of the battery is in a fully discharged state, an amount of the alkali metal in an anode of the battery is no more than 50% of a capacity of the anode.

According to some of any of the embodiments of the invention, a ratio of the volume of the alloy upon maximal absorption of the alkali metal to the volume enclosed by a shell or matrix is uniform among at least 90% of the particles.

According to some of any of the embodiments of the invention, a volume of the alloy upon maximal absorption of the alkali metal is at least 80% of the volume enclosed by a shell or matrix.

According to some of any of the embodiments of the invention, the shell or matrix is selected so as to be insoluble in a liquid comprising an electrolyte.

According to some of any of the embodiments of the invention, the shell or matrix is substantially free of pores of at least 2 nm in diameter.

According to some of any of the embodiments of the invention, the shell or matrix which conducts cations of the alkali metal comprises an ion conductor comprising the alkali metal, the ion conductor being selected from the group consisting of a salt, a polymer electrolyte, a glass, a ceramic and any combination thereof.

According to some of any of the embodiments of the invention, the ion conductor is selected from the group consisting of a carbonate salt of the alkali metal, a sulfate salt of the alkali metal, a fluoride salt of the alkali metal, a metal disulfide comprising the alkali metal, a metal oxide comprising the alkali metal, and a metal phosphate comprising the alkali metal, and any combination thereof.

According to some of any of the embodiments of the invention, the ion conductor is doped with at least one divalent cation and/or trivalent cation.

According to some of any of the embodiments of the invention, the ion conductor has a melting point lower than a melting point of the alloy upon maximal absorption of the alkali metal.

According to some of any of the embodiments of the invention, the shell or matrix comprises at least one electron conductor.

According to some of any of the embodiments of the invention, the electron conductor is selected from the group consisting of carbon nanoparticles, metal nanoparticles, a metal sulfide and a metal disulfide.

According to some of any of the embodiments of the invention, the compound which forms an alloy with an alkali metal is selected from the group consisting of silicon, tin, antimony, germanium, lead, bismuth, magnesium, aluminum and mixtures thereof.

According to some of any of the embodiments of the invention, the alkali metal is lithium.

According to some of any of the embodiments of the invention, the alloy upon maximal absorption of the alkali metal has a general formula selected from the group consisting of $Li_xSi$, wherein x is in a range of from 2.5 to 4.4; $Li_xSn$, wherein x is in a range of from 2.5 to 4.4; and $Li_xSb$, wherein x is in a range of from 1 to 3.

According to some of any of the embodiments of the invention, the alloy upon maximal absorption of the alkali metal is selected from the group consisting of $Li_{4.2}Si$, $Li_{4.4}Sn$, $Li_3Sb$, $Li_{4.4}Ge$, $Li_{17}Pb_{83}$, $Li_3Bi$, $Li_{32.2}Sb_{31.8}Mn_{36}$, $Li_{4.4}Ge_{1-y}Sn_y$, wherein y is between 0 and 1.

According to some of any of the embodiments of the invention, y is in a range of from 0.1 to 0.4.

According to some of any of the embodiments of the invention, the shell or matrix comprises at least one lithium compound selected from the group consisting of lithium sulfate, lithium fluoride and $Li_4Ti_5O_{12}$.

According to some of any of the embodiments of the invention, the at least one lithium compound is doped with calcium.

According to some of any of the embodiments of the invention, the shell or matrix comprises at least one additional compound selected from the group consisting of calcium fluoride and alumina, and the particles and/or the shell or matrix comprises at least one additional compound selected from the group consisting of molybdenum disulfide, tungsten disulfide, copper sulfide and nickel.

According to some of any of the embodiments of the invention, the compound which forms an alloy with an alkali metal is silicon.

According to some of any of the embodiments of the invention, an average size of the particles encapsulated by the shell or matrix is in a range of from 1 to 1000 nm.

According to some of any of the embodiments of the invention, an average size of the particles is in a range of from 30 to 300 nm.

According to some of any of the embodiments of the invention, the shell or matrix is formed from particles characterized by an average size in a range of from 0.5 to 100 nm.

According to some of any of the embodiments of the invention, the shell or matrix is formed from particles characterized by an average size in a range of from 1 to 20 nm.

According to some of any of the embodiments of the invention, the composition-of-matter described herein is in a form of a powder.

According to some of any of the embodiments of the invention relating to a process described herein, the coating described herein comprises:

mixing the particles comprising the alloy with particles of the conductor of cations of the alkali metal, and optionally with additional particles of an electron conductor, to obtain a mixture; and subjecting the mixture to a heat treatment, to thereby form the shell or matrix.

According to some of any of the embodiments of the invention, the heat treatment effects sintering of particles in the mixture.

According to some of any of the embodiments of the invention, the sintering is effected by heating for at least 1 hour at a temperature of no more than 10° C. lower than a melting point of the conductor of cations of the alkali metal.

According to some of any of the embodiments of the invention, the heat treatment effects melting of the particles comprising the conductor of cations of the alkali metal and/or the additional particles of an electron conductor, but not melting of the particles comprising the alloy.

According to some of any of the embodiments of the invention, the heat treatment comprises heating to a temperature above a melting point of at least one ion conductor and/or electron conductor in the substance which conducts cations of the alkali metal, and below a melting point of the alloy.

According to some of any of the embodiments of the invention, the shell or matrix is formed from particles characterized by a width in a range of from 0.5 to 100 nm.

According to some of any of the embodiments of the invention relating to a process described herein, the process further comprises grinding the composition-of-matter to form a powder.

According to some of any of the embodiments of the invention, the process comprises forming any of the particles described herein by ball-milling.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
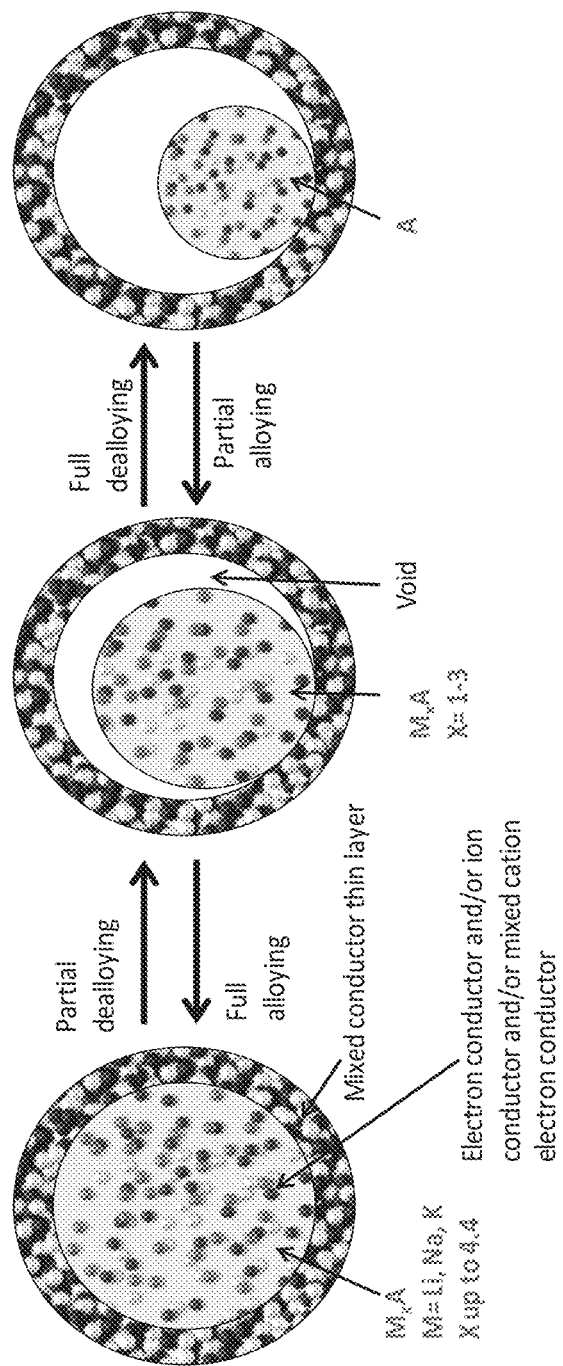
FIG. 1 is a schematic illustration of a charge-discharge process according to some embodiments of the invention.
Figure 2:
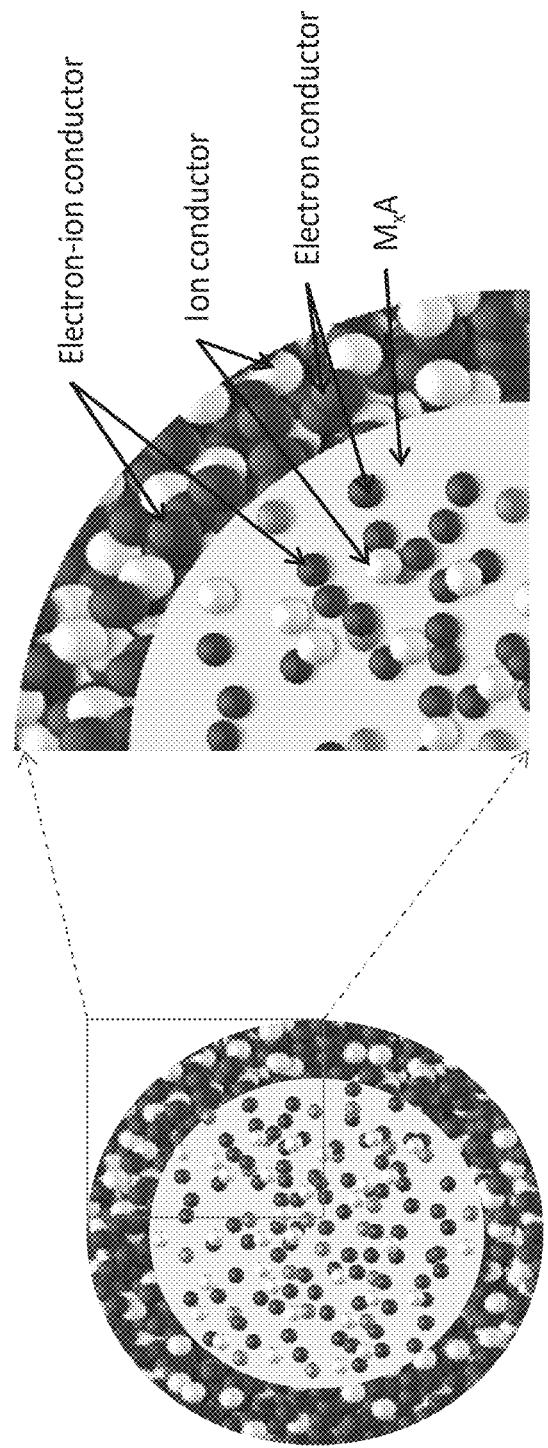
FIG. 2 is a schematic illustration of a particle comprising an alloy of an alkali metal (optionally doped with electron conductor, ion conductor (preferably cation conductor), and/or electron-ion conductor particles) encapsulated by a matrix material formed from electron conductor, ion conductor and/or electron-ion conductor particles, according to some embodiments of the invention.
Figure 3:
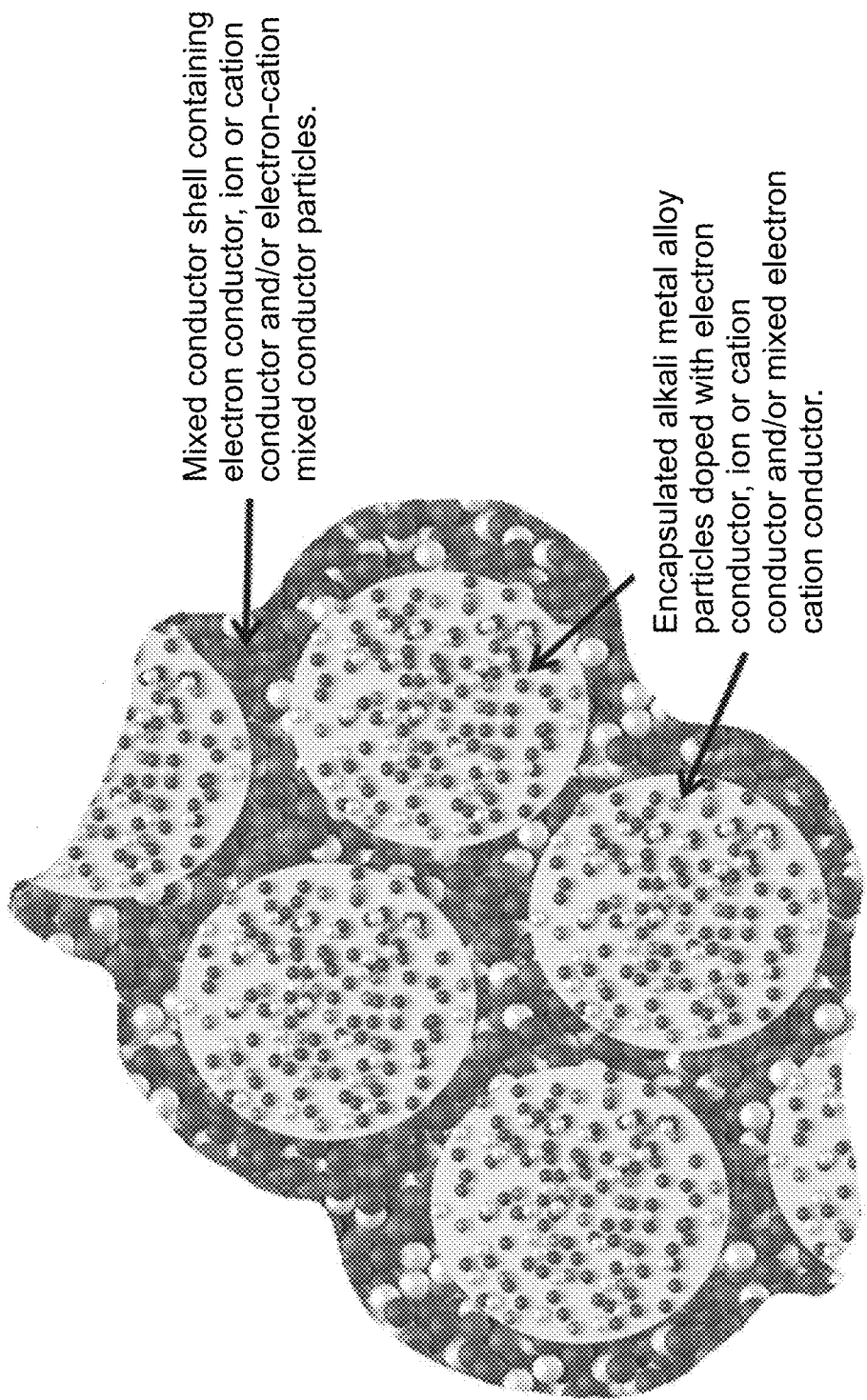
FIG. 3 is a schematic illustration of a cluster of particles comprising an alloy of an alkali metal (such as depicted in FIG. 2) encapsulated in a common matrix formed from electron conductor, ion conductor and/or electron-ion conductor particles, according to some embodiments of the invention.

The present invention, in some embodiments thereof, relates to electrochemistry and more particularly, but not exclusively, to compositions comprising an alkali metal alloy which can be used in an electrode of an alkali metal battery.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have envisioned that encapsulation of particles comprising an alkali metal-rich alloy overcomes significant obstacles in long-term cycling of batteries utilizing alkali metal ions. In particular, such encapsulation advantageously results in each particle being trapped within a protective cage which matches the maximal volume of the particle, that is, the volume upon maximal absorption of the alkali metal by the particle. Release of the alkali metal from the particles (e.g., upon discharge) results in a decrease in the particle volume, leaving a void within the cage. The cages are resistant to expansion of the particles upon re-absorption of the alkali metal, because the particle volume does not exceed the volume in the cage at any stage of release or absorption of the alkali metal. Furthermore, such encapsulation facilitates control over the relative size of the void in each cage, and makes efficient use of space by avoiding voids which are considerably larger than needed to accommodate the particles. The encapsulated particles prepared as described herein may be used for preparing electrodes (e.g., anodes) for alkali metal batteries.

The present inventors have further envisioned that the encapsulation of an alloy-containing particle described herein allows for the cages to be prepared from any of a wide variety of compounds, which may be selected to provide optimal ion conduction and/or electron conduction properties, as well as suitable insolubility in a surrounding liquid, such as an electrolyte solution.

While reducing the present invention to practice, the present inventors have encapsulated particles of a lithium/silicon alloy and used them to assemble an anode. The particles were encapsulated in a material composed primarily of lithium cation conductors, optionally with some electron conductors, which were sintered and/or melted to form a mechanically resistant cage (which can also be referred to as a cation-permeable and optionally also electron-permeable membrane). The anode exhibited a high capacity and high coulombic efficiency over the course of many charge-discharge cycles.

According to an aspect of some embodiments of the invention, there is provided a composition-of-matter comprising a plurality of particles, the particles comprising at least one of the following substances:

a) a compound or element (e.g., other than an alkali metal) which forms an alloy with the alkali metal; and b) an alloy of the alkali metal with the compound or element, the alloy reversibly releasing an alkali metal while decreasing in volume and absorbing said alkali metal while increasing in volume. It is to be appreciated that the compound or element which forms an alloy and the alloy represent different degrees of alkali metal absorption for a single substance, wherein the substance is an alloy upon absorption of the alkali metal (e.g., upon maximal absorption of the alkali metal) and is in the form of the compound or element upon release of all of the alkali metal.

Particles:

In some embodiments of any one of the embodiments described herein, for at least a portion of the particles, and optionally for all of the particles, each particle is encapsulated within a volume enclosed by a shell or matrix which conducts cations of the alkali metal (cation permeable membrane, or cation-permeable shell or cation-permeable matrix), wherein a volume of the alloy upon maximal absorption of the alkali metal does not exceed the volume enclosed by a shell or matrix, as described in detail hereinafter.

As used herein, the phrase "volume of the alloy upon maximal absorption of the alkali metal" refers to the volume of a first form of the substance, as described herein. The maximal absorption refers to the maximal degree of absorption under certain conditions (e.g., a specific range of electrochemical potentials). Thus, a single alloy may be characterized by two or more distinct degrees of "maximal absorption" (e.g., degrees of absorption characterized by different crystalline forms and/or stoichiometries of the alloy), each degree being associated with different conditions. For a non-limiting example, under certain conditions an alloy of lithium with an element (A) may absorb lithium until an alloy $Li_2A$ is obtained (the maximal absorption being a 2:1 molar ratio of lithium to element A), whereas under other conditions the alloy may absorb additional lithium until an alloy $Li_{3.75}A$ (which may also be described as $Li_{15}A_4$) or $Li_{4.4}A$ (which may also be described as $Li_{22}A_5$) is obtained (the maximal absorption being a 3.75:1 or 4.4:1 molar ratio of lithium to element A, respectively).

As used herein, the phrase "volume enclosed by a shell or matrix" refers to the volume within a shell or matrix which is available for occupation by the alloy reversibly releasing an alkali metal and does not include the volume occupied by components of the particles other than the alloy reversibly releasing an alkali metal.

Herein, the term "alloy" refers to a mixture or solid solution composed of a metal (e.g., the alkali metal described herein) and one or more other elements, at any molar ratio of metal to the other element(s). In some embodiments, the alloy may comprise (e.g., upon maximal absorption of the alkali metal) a single phase of alkali metal and the other element(s). The compound or element which forms an alloy with the alkali metal may be an element or a mixture of elements (other than the alkali metal according to any of the respective embodiments described herein). Preferably, the compound(s) or element(s) which forms an alloy with the alkali metal is not an alkali metal.

Herein, references to a "compound" are intended to encompass elements and mixtures of elements, unless explicitly indicated otherwise.

Herein, a compound or element "which forms an alloy" with an alkali metal refers to a compound or element which exhibits the property of being capable of forming, or which forms, an alloy with the alkali metal upon combination with the alkali metal, as opposed, for example, to remaining in a separate phase from the alkali metal. Optionally, the alloy is characterized by a specific stoichiometric proportion of alkali metal atoms, e.g., according to any of the respective embodiments described herein. The skilled person will be readily capable of determining which compounds an elements form an alloy with any given alkali metal.

Herein, the phrase "alkali metal" encompasses lithium, sodium, potassium, rubidium and cesium and combinations thereof, and encompasses alkali metal atoms (e.g., metallic forms of alkali metals) and alkali metal cations (e.g., in solution and/or in a salt or a substance described herein).

According to some embodiments of any one of the embodiments described herein, the alkali metal is lithium.

Herein, the phrase "reversibly releasing an alkali metal while decreasing in volume and absorbing said alkali metal while increasing in volume" (also abbreviated to the phrase "reversibly releasing an alkali metal", the two aforementioned phrases being used interchangeably herein) refers to a substance as described herein, which encompasses a first form of the substance which is an alloy having a relatively high alkali metal content, a second form of the substance having a relatively low (optionally zero or close to zero, for example, less than 10% by molar concentration) alkali metal content (e.g., an alloy having a low alkali metal content or the compound or element which forms an alloy with the alkali metal), and all alloys having an intermediate alkali metal content.

The phrase "reversibly releasing" means that the first form of the substance is capable of releasing, or releases, the alkali metal until the second form of the substance is obtained; the second form of the substance is capable of absorbing, or absorbs, the alkali metal until the first form of the substance is re-obtained; and the re-obtained first form of the substance is capable of re-releasing, or re-releases, the alkali metal. Release and/or absorption of the alkali metal may involve oxidation and/or reduction of the alkali metal, e.g., conversion of an alkali metal atom to an ion upon release and vice versa upon absorption. The second form of the substance is typically characterized by a lower volume than the first form of the substance due to the loss of atoms via release of the alkali metal. In some embodiments, the alkali metal undergoes release and absorption from the alloy in the form of alkali metal cations.

The amount of alkali metal which can be released and absorbed by a substance may be represented as the difference between an amount of alkali metal in the abovementioned first form of the substance and an amount of alkali metal in the abovementioned second form of the substance.

According to some embodiments of any one of the embodiments described herein, a concentration of alkali metal in the first form of the substance is greater than a concentration of alkali metal in the second form of the substance by at least 0.005 moles per $cm^3$. In some embodiments, a concentration of alkali metal in the first form of the substance is greater than a concentration of alkali metal in the second form of the substance by at least 0.01 moles per $cm^3$. In some embodiments, a concentration of alkali metal in the first form of the substance is greater than a concentration of alkali metal in the second form of the substance by at least 0.02 moles per $cm^3$. In some embodiments, a concentration of alkali metal in the first form of the substance is greater than a concentration of alkali metal in the second form of the substance by at least 0.05 moles per $cm^3$.

According to some embodiments of any one of the embodiments described herein, a weight percentage of alkali metal in the first form of the substance is greater than a weight percentage of alkali metal in the second form of the substance by at least 2%, for example, wherein a weight percentage of alkali metal in the second form is no more than 1% and a weight percentage of alkali metal in the first form is at least 3%. In some embodiments, a weight percentage of alkali metal in the first form of the substance is greater than a weight percentage of alkali metal in the second form of the substance by at least 5%. In some embodiments, a weight percentage of alkali metal in the first form of the substance is greater than a weight percentage of alkali metal in the second form of the substance by at least 10%. In some embodiments, a weight percentage of alkali metal in the first form of the substance is greater than a weight percentage of alkali metal in the second form of the substance by at least 20%. In some embodiments, a weight percentage of alkali metal in the first form of the substance is greater than a weight percentage of alkali metal in the second form of the substance by at least 50%.

According to some embodiments of any one of the embodiments described herein, a molar percentage of alkali metal the percentage of atoms which are atoms of the alkali metal) in the first form of the substance is greater than a molar percentage of alkali metal in the second form of the substance by at least 20%, for example, wherein a molar percentage of alkali metal in the second form is no more than 5% and a molar percentage of alkali metal in the first form is at least 25%. In some embodiments, a molar proportion of alkali metal in the first form of the substance is greater than a molar proportion of alkali metal in the second form of the substance by at least 30%. In some embodiments, a molar proportion of alkali metal in the first form of the substance is greater than a molar proportion of alkali metal in the second form of the substance by at least 50%. In some embodiments, a molar proportion of alkali metal in the first form of the substance is greater than a molar proportion of alkali metal in the second form of the substance by at least 75%, for example, wherein a molar percentage of alkali metal in the second form is no more than 5% and a molar percentage of alkali metal in the first form is at least 80%.

Any substance that can incorporate variable amounts of alkali metal atoms, and preferably which features changes in volume as described in the respective embodiments is contemplated.

According to some embodiments of any one of the embodiments described herein, the compound which forms an alloy with an alkali metal (e.g., lithium) comprises (and optionally consists of) silicon, tin, antimony, germanium, lead, bismuth, magnesium, aluminum, and/or an alloy of any one or more of the aforementioned elements with any other element, including, for example, mixtures (e.g., alloys) of any two or more of the aforementioned elements). Antimony-manganese alloy is an example of a suitable antimony alloy. Germanium-tin alloy is a suitable example of an alloy of two of the aforementioned elements.

In some embodiments of any one of the embodiments described herein, the alloy may be described by the general formula $M_xA$, wherein M is the alkali metal, for example, lithium, sodium and/or potassium), and A is an element which forms an alloy with the alkali metal, for example, silicon, tin, antimony, germanium, lead, bismuth, and/or mixtures thereof. Examples of such alloys include, without limitation, alloys wherein A is silicon and x=4.2 (e.g., $Li_{4.2}Si$) or x=4.4 (e.g., $Li_{4.4}Si$), A is tin and x=4.4 (e.g., $Li_{4.4}Sn$), A is antimony and x=3 (e.g., $Li_3Sb$), A is germanium and x=4.4 (e.g., $Li_{4.4}Ge$), A is lead and x is about 0.2 (e.g., $Li_{17}Pb_{83}$), A is bismuth and x=3 (e.g., $Li_3Bi$), A is antimony-manganese and x is about 0.5 (e.g., $Li_{32.2}Sb_{31.8}Mn_{36}$), and wherein A is a germanium-tin alloy (e.g., $Ge_{1-y}Sn_y$, wherein y=0.1-0.4).

According to some embodiments of any one of the embodiments described herein, silicon, tin and/or antimony are used to form an alloy with any alkali metal, optionally lithium and/or sodium. In some embodiments, the alkali metal comprises sodium and the alloy upon maximal absorption of sodium has a ratio of from 0.1 to 0.5 sodium atoms per atom of silicon, tin and/or antimony.

According to some embodiments of any one of the embodiments described herein relating to alloy having the general formula $M_xA$ upon maximal absorption of the alkali metal, the alkali metal M is lithium, such that the alloy has the formula $Li_xA$, wherein A is an element which forms an alloy with lithium, for example, silicon, tin, aluminum, magnesium, antimony and/or mixtures (e.g., alloys) thereof. In some embodiments, x is in a range of from 2 to 4.4 (optionally from 2.5 to 4.4) when A is silicon (Si) and/or tin (Sn), and x is in a range of from 1 to 3 when A is antimony (Sb), aluminum (Al) and/or magnesium (Mg). Examples of such alloys include, without limitation, $Li_xSi$ wherein x is in a range of from 2.5 to 4.4, $Li_xSn$ wherein x is in a range of from 2.5 to 4.4 and $Li_xSb$ wherein x is in a range of from 1 to 3.

Optionally, the amount of alkali metal (e.g., lithium) upon maximal absorption is selected so as to have a suitable melting point (e.g., a melting point higher than that of a material used to form the shell or matrix), as described herein according to any of the respective embodiments.

According to some embodiments of any one of the embodiments described herein, an average size of the particles is in a range of from 1 to 5000 nm.

According to some embodiments of any one of the embodiments described herein, an average size of the particles is in a range of from 1000 to 5000 nm.

According to some embodiments of any one of the embodiments described herein, an average size of the particles is in a range of from 100 to 1000 nm.

According to some embodiments of any one of the embodiments described herein, an average size of the particles is in a range of from 10 to 100 nm.

According to some embodiments of any one of the embodiments described herein, an average size of the particles is in a range of from 30 to 300 nm.

In some embodiments of any one of the embodiments described herein, the average size of the particles is less than 20 nm. In some such embodiments, the average size is from 1 to 10 nm.

Herein, an "average size" refers to the mean size. The size of any given particle or powder grain described herein may be determined as the maximal length of the particle, as viewed from one angle (e.g., as is typical in microscopy).

Non-limiting examples of additional materials (e.g., other than a compound comprising the alkali metal and/or the alloy reversibly releasing an alkali metal) which may be included in the particles include, without limitation, ant ion conductor and/or electron conductor described herein.

Examples of additional materials which may optionally be incorporated in the particles according to some embodiments of any one of the embodiments described herein, include, without limitation, molybdenum sulfide, tungsten disulfide, copper sulfide and nickel (e.g., nickel nanoparticles).

Shell/Matrix:

As mentioned hereinabove, in some embodiments, at least a portion of the particles (according to any of the embodiments described herein relating to the features of the particles) are each encapsulated within a volume enclosed by a shell or matrix, wherein a volume of the alloy in the particle upon maximal absorption of the alkali metal does not exceed the volume enclosed by the shell or matrix.

Herein, the phrase "shell or matrix" refers to a substance having a shape which encompasses at least one void (e.g., a void occupied at least in part by a particle described herein). Typically, the term "shell" refers to a form (e.g., a membrane) encompassing a single void or a small number of voids, whereas the term "matrix" refers to a continuous phase (e.g., a network of interconnected membranes) encompassing many voids (which may be considered as many shells joined together). However, there is no significant difference between the substance of a shell and a matrix, and the terms "shell", "matrix" and "shell or matrix" are used interchangeably herein.

According to some embodiments of any one of the embodiments described herein, the shell or matrix is selected (e.g., the components thereof are selected) so as to be insoluble in a liquid comprising an electrolyte (e.g., a liquid according to any of the respective embodiments described herein), for example, a liquid comprising an electrolyte in an electrochemical half cell (e.g., in a battery) in which the composition-of-matter is intended to be included (e.g., according to any of the respective embodiments described herein).

The shell or matrix is preferably substantially free of pores and/or holes of a size sufficient to allow escape of the compound which forms an alloy with the alkali metal from within the shell or matrix.

In some embodiments of any one of the embodiments described herein, the shell or matrix is substantially free of pores of at least 2 nm in diameter. In some embodiments, the shell or matrix is substantially free of pores of at least 1 nm in diameter. In some embodiments, the shell or matrix is substantially free of pores of at least 0.5 nm in diameter. In some embodiments, the shell or matrix is substantially free of pores of at least 0.3 nm in diameter.

As used herein, the term "pore" refers to a hole in a shell or matrix which connects a void within a shell or matrix with a volume external to the shell or matrix.

As used herein, the phrase "substantially free of pores" means that at least 50% of the particles (optionally at least 60%, optionally at least 70%, optionally at least 80%, optionally at least 90%, optionally at least 95% and optionally at least 99% of the particles) are coated by a shell or matrix which does not include a pore (e.g., a pore of a diameter described herein) adjacent to the particle (e.g., which could allow escape of contents of the particle through the pore).

According to some embodiments of any one of the embodiments described herein, a ratio of the volume of the alloy upon maximal absorption of the alkali metal to the volume enclosed by a shell or matrix is uniform among at least 90% of the particles.

As used herein, the term "uniform" refers to set of values (e.g., the abovementioned ratio for different particles) characterized by a standard deviation which is no more than 20% of the mean of the values. In some embodiments of any one of the embodiments described herein relating to a uniform volume, the standard deviation is no more than 10% of the mean. In some embodiments, the standard deviation is no more than 5% of the mean. In some embodiments, the standard deviation is no more than 2% of the mean. In some embodiments, the standard deviation is no more than 1% of the mean.

According to some embodiments of any one of the embodiments described herein, a volume of the alloy upon maximal absorption of the alkali metal is at least 80% of the volume enclosed by a shell or matrix (e.g., calculated as an average for a plurality of particles). In some embodiments, the volume is at least 90%. In some embodiments, the volume is at least 95%. In some embodiments, the volume is at least 98%. In some embodiments, the volume is at least 99%.

According to some embodiments of any one of the embodiments described herein, the shell or matrix which conducts cations of the alkali metal comprises an ion conductor comprising the alkali metal. An ion conductor comprising the alkali metal in a shell or matrix is different than the alloy reversibly releasing the alkali metal. The ion conductor may be, for example, a salt (optionally a chloride, bromide, fluoride, carbonate and/or sulfate salt of the alkali metal), a glass, and/or a ceramic. In some embodiments, the ion conductor is characterized by a transference number for cations of the alkali metal (e.g., as determined using a standard technique) which is at least 0.7, optionally at least 0.8, optionally at least 0.9, optionally at least 0.95, optionally at least 0.98, and optionally at least 0.99.

According to some embodiments of any one of the embodiments described herein, the ion conductor comprises (and optionally consists of) a carbonate salt of the alkali metal, a sulfate salt of the alkali metal, a fluoride salt of the alkali metal, a metal sulfide and/or disulfide comprising the alkali metal, a metal oxide (e.g., an oxide of an alkali metal, Ti, Ni, Co, Mn, Fe or any mixture thereof) comprising the alkali metal, and/or a metal phosphate comprising the alkali metal.

Examples of suitable metal disulfides include, without limitation, $TiS_2$, $MoS_2$, $WS_2$, $CoS_2$ and $FeS_2$. $CoO_2$ and $Ni_{0.33}Mn_{0.33}Co_{0.33}O_2$ are non-limiting examples of a suitable metal oxides. $FePO_4$ is a non-limiting example of a suitable metal phosphate. CuS is non-limiting example of a suitable metal sulfide.

The metal sulfide, metal disulfide, metal oxide and/or metal phosphate comprising the alkali metal may be, for example, in an alkalated form. $LiTiS_2$, $LiMoS_2$, $LiCoS_2$ and $LiFeS_2$ are non-limiting examples of a suitable metal disulfide in alkalated form (e.g., an alkalated form of $TiS_2$, $MoS_2$, $CoS_2$ and $FeS_2$, respectively). $LiCoO_2$ and $LiNi_{0.33}Mn_{0.33}Co_{0.33}O_2$ are non-limiting examples of suitable metal oxides in alkalated form (e.g., an alkalated form of $CoO_2$ and $Ni_{0.33}Mn_{0.33}Co_{0.33}O_2$, respectively). $LiFePO_4$ is a non-limiting example of a suitable metal phosphate in alkalated form (e.g., an alkalated form of $FePO_4$). LiCuS is non-limiting example of a suitable metal sulfide in alkalated form (e.g., an alkalated form of CuS).

As used herein, the term "alkalated" refers to a compound comprising an alkali metal, wherein the compound can reversibly release some or all of the alkali metal, resulting in a stable compound with less alkali metal or with no alkali metal (a "non-alkalated" compound). The alkalated compound and non-alkalated compound may be considered as different forms of a single compound having a variable amount of alkali metal, including amounts which are optionally intermediate between the fully alkalated forms and the non-alkalated forms described herein.

For example, alkalated metal disulfides, oxides and phosphates may release or absorb various numbers of lithium ions concurrently with release or acceptance, respectively, of a corresponding number of electrons by metal ions therein, thereby preserving a substantially neutral electric charge.

Herein, the terms "CuS", "LiCuS" and "copper sulfide" encompass compounds having a ratio of copper atoms to sulfur atoms in a range of from 0.5 to 2 (i.e., $Cu_xS_y$, wherein x/y is from 0.5 to 2), preferably from 0.5 to 1.5. Many forms of copper sulfide comprise disulfide anions (e.g., in combination with sulfide ions), and may thus also be considered a type of metal disulfide.

$Li_4Ti_5O_{12}$ is an additional example of a suitable metal oxide comprising an alkali metal. Alkalated forms of $Li_4Ti_5O_{12}$ include, for example, $Li_7Ti_5O_{12}$.

According to some embodiments of any one of the embodiments described herein, the shell or matrix comprises at least one compound comprising the alkali metal (e.g., a conductor of the alkali metal cation, according to any of the respective embodiments described herein). In some embodiments, the shell or matrix comprises at least one salt of the alkali metal, according to any of the respective embodiments described herein.

According to some embodiments (e.g., wherein the alkali metal comprises lithium, according to any of the respective embodiments described herein), the shell or matrix comprises at least one lithium compound. Examples of suitable lithium compounds include, without limitation, lithium sulfate, lithium fluoride, lithium carbonate, $Li_4Ti_5O_{12}$ and any combinations thereof.

According to some embodiments of any one of the embodiments described herein, the shell or matrix comprises at least one additional compound, other than a compound comprising the alkali metal. Examples of suitable additional compounds include, without limitation, calcium fluoride and alumina.

According to some embodiments, the salt of the alkali metal, according to any of the respective embodiments described herein, is mixed with an ionic liquid (e.g., an ionic liquid described herein), optionally in an amount of up to 25% by volume of the mixture of salt and ionic liquid. Optionally, the mixing is performed by adding the ionic liquid to the salt before milling the salt.

According to some embodiments of any one of the embodiments described herein, the ion conductor (e.g., a salt of an alkali metal) is doped with at least one divalent cation and/or trivalent cation, optionally by adding a chloride, bromide, fluoride, carbonate and/or sulfate salt of the divalent and/or trivalent cation. Examples of suitable divalent and trivalent cations include, without limitation, $Mg^{2+}$, $Ca^{2+}$, $Ba^{2+}$, $Sr^{2+}$, $Ga^{3+}$, $Al^{3+}$ and any combinations thereof. In some embodiments, the divalent cation is $Mg^{2+}$ and/or $Ca^{2+}$.

In some embodiments, the ion conductor comprises at least one lithium-containing compound described herein (according to any of the respective embodiments) doped with $Ca^{2+}$.

According to some embodiments, a compound (e.g., a salt according to any of the respective embodiments described herein) in the shell or matrix, optionally a lithium compound (e.g., a lithium salt according to any of the respective embodiments described herein), is doped with a divalent cation, optionally magnesium and/or calcium.

Herein, the term "doped" refers to substitution of a small portion of an ion (e.g., an alkali metal cation) in a salt with an equivalent amount of another ion (e.g., an amount of divalent cation and/or trivalent cation having about the same total charge as the substituted ion).

Without being bound by any particular theory, it is believed that doping in the shell or matrix with a divalent and/or trivalent cation substantially increases the conductivity of the shell or matrix to the alkali metal ions.

According to some embodiments of any one of the embodiments described herein, the ion conductor has a melting point lower than a melting point of the alloy upon maximal absorption of the alkali metal. In some embodiments, the ion conductor has a melting point which is at least 10° C. lower than a melting point of the alloy upon maximal absorption of the alkali metal. In some embodiments, the ion conductor has a melting point which is at least 20° C. lower than a melting point of the alloy upon maximal absorption of the alkali metal. In some embodiments, the ion conductor has a melting point which is at least 50° C. lower than a melting point of the alloy upon maximal absorption of the alkali metal. In some embodiments, the ion conductor has a melting point which is at least 100° C. lower than a melting point of the alloy upon maximal absorption of the alkali metal. In some embodiments, the ion conductor has a melting point which is at least 200° C. lower than a melting point of the alloy upon maximal absorption of the alkali metal.

In some embodiments of any one of the embodiments described herein, the ion conductor comprises a mixture of compounds, which allows for lowering of the melting point (optionally to below the melting point of any one of the compounds in the ion conductor in a pure form). In some embodiments, the mixture comprises any two of a sulfate salt (e.g., lithium sulfate), a fluoride salt (e.g., lithium fluoride) and a carbonate salt (e.g., lithium carbonate), optionally in a ratio in range of from 3:2 to 2:3.

According to some embodiments of any one of the embodiments described herein, the shell or matrix comprises at least one electron conductor. An electron conductor described herein may be a different compound than an ion conductor, or a compound which is both an electron conductor and an ion conductor (also referred to herein as an "electron-ion conductor").

Herein, the term "electron conductor" encompasses substances capable of conduction of, or which conduct, electrons per se and/or electron holes, and an applied electric potential.

According to some embodiments of any one of the embodiments described herein relating to an electron conductor, the electron conductor may comprise (and optionally consist of), for example, carbon nanoparticles, metal nanoparticles, a metal sulfide a metal disulfide, metal phosphate and/or a metal oxide. In some embodiments, the metal sulfide, metal disulfide and/or metal oxide is doped (e.g., to enhance electron conduction). The metal of the aforementioned metal nanoparticles, metal sulfide, metal disulfide and/or metal oxide may be, for example, nickel, cobalt, iron, copper, titanium, and/or tin. $TiO_2$ and tin oxides, which may optionally be doped (e.g., to enhance electron conduction), are examples of suitable metal oxides for use as electron conductors.

As used herein, the phrase "carbon nanoparticles" encompasses all nanoparticles which are at least 50% carbon by weight, including, for example, particles comprising carbon black, graphite, carbon nanotubes, graphene, graphene oxide and combinations thereof.

As used herein, the phrase "metal nanoparticles" refers to nanoparticles of a metal and/or a metal oxide.

In some embodiments of any one of the embodiments described herein, the metal nanoparticles comprise nickel.

According to some embodiments of any one of the embodiments described herein, the shell or matrix comprises at least one ion conductor (e.g., according to any of the respective embodiments described herein) and at least one electron conductor (e.g., according to any of the respective embodiments described herein). An ion conductor and electron conductor may optionally be a single compound, i.e., an electron ion conductor, which may be used as a sole conductor or in combination with one or more additional ion conductors and/or electron conductors.

The electron-ion conductor may optionally be a metal sulfide and/or disulfide, a metal oxide and/or a metal phosphate according to any of the respective embodiments described herein, for example, in an alkalated form. $MoS_2$, $TiS_2$, $CoS_2$, $FeS_2$ and CuS, which may optionally be in alkalated form (e.g., as $LiMoS_2$, $LiTiS_2$, $LiCoS_2$, $LiFeS_2$ and $LiCuS$, respectively) or non-alkalated form, are non-limiting examples of suitable electron-ion conductors.

In some embodiments of any one of the embodiments described herein, the shell or matrix is sufficiently thin so as to allow electron conduction without inclusion of an electron conductor.

In some embodiments of any one of the embodiments described herein, a thickness of the shell or matrix is no more than 100 nm. In some embodiments, the thickness is no more than 50 nm. In some embodiments, the thickness is no more than 25 nm. In some embodiments, the thickness is no more than 12.5 nm. In some embodiments, the thickness is no more than 5 nm. In some embodiments, the thickness is at least 0.5 nm. In some embodiments, the thickness is from 0.5 to 5 nm.

According to some embodiments of any one of the embodiments described herein, the particles are coated by a layer of carbon (optionally carbon nanoparticles). In some such embodiments, the layer of carbon comprises (and optionally consists essentially of) carbon nanoparticles. Optionally, the layer of carbon (e.g., carbon nanoparticles) coats the ion and/or electron conductor(s) described herein.

In some embodiments, a thickness of the carbon layer (e.g., layer of carbon nanoparticle) is in a range of from 0.5 to 300 nm. In some embodiments, a thickness of the carbon layer is in a range of from 0.5 to 30 nm.

According to some embodiments of any one of the embodiments described herein, the shell or matrix is formed from particles (e.g., particles of an electron conductor, ion conductor and/or electron-ion conductor described herein according to any of the respective embodiments) having a size (e.g., average size) in a range of from 0.5 to 100 nm. In some embodiments, the average size of the particles from which the shell or matrix is formed is in a range of from 0.5 to 25 nm. In some embodiments, the average size of the particles from which the shell or matrix is formed is in a range of from 1 to 20 nm. In some embodiments, the average size of the particles from which the shell or matrix is formed is in a range of from 3 to 30 nm. In some embodiments, the shell or matrix is formed from particles having an average size in at least one of the aforementioned ranges, and the particles comprising the alloy reversibly releasing an alkali metal have a size (e.g., average size) of from 100 to 500 nm, preferably 30 to 300 nm.

In some embodiments of any one of the embodiments described herein, an average size of the particles from which the shell or matrix is formed is in a range of from 0.5% to 20%, and optionally from 5% to 20%, of an average size of the particles comprising the alloy capable of reversibly releasing, or reversibly releasing, an alkali metal.

Without being bound by any particular theory, it is believed that substantially smaller particles tend to accumulate in interstices between larger particles, and thereby may readily form a shell or matrix enclosing the larger particles upon merging of the smaller particles, for example, by melting and/or sintering.

In some embodiments of any one of the embodiments described herein, the particles from which the shell or matrix is formed are fused by sintering and/or partial melting.

According to some embodiments of any one of the embodiments described herein, the composition-of-matter is in a form of a powder. Grains of such a powder may comprise a single particle (within a shell), and/or multiple particles (e.g., within a common matrix). In some embodiments, the powder grains have an average size in a range of from 0.01 to 0.1 µm. In some embodiments, the powder grains have an average size in a range of from 0.1 to 1 µm. In some embodiments, the powder grains have an average size in a range of from 1 to 10 µm.

It is to be understood that any one of the embodiments of invention described herein relating to a feature described herein may be combined with any one of the embodiments of invention described herein relating to another feature described herein, unless the features are incompatible. For example, an alloy reversibly releasing an alkali metal (and/or compound which forms such an alloy) according to any one of the embodiments described herein relating to such an alloy (and/or compound) may optionally be combined with a shell or matrix according to any one of the embodiments described herein relating to the shell or matrix, with an ion conductor according to any one of the embodiments described herein relating to an ion conductor, and/or with an electron conductor according to any one of the embodiments described herein relating to an electron conductor, and may optionally be utilized in a form of a battery according to any one of the embodiments described herein relating to a battery, and/or prepared according to a process according to any one of the embodiments described herein relating to a process, except when the features are incompatible.

Utilization of Composition-of-Matter:

According to another aspect of embodiments of the invention, there is provided an electrochemical half cell comprising an electrode, optionally an anode, which comprises a composition-of-matter which comprises an alloy reversibly releasing an alkali metal, according to any of the respective embodiments described herein, and a liquid comprising an electrolyte, optionally an electrolyte solution.

According to some embodiments of any one of the embodiments described herein, the shell or matrix which conducts conducting cations of the alkali metal is insoluble in the liquid comprising an electrolyte.

According to some embodiments of any one of the embodiments described herein, the liquid comprising an electrolyte comprises an ionic liquid (e.g., pyridine and/or pyrrolidinium cations), for example, an ionic liquid known in the art to be suitable for an alkali metal ion battery, optionally an alkali metal ion sulfur battery. The ionic liquid may optionally comprise a cation such as a 1,3-dialkylimidazolium (e.g., 1-ethyl-3-methylimidazolium, 1-butyl-3-methylimidazolium and/or 1-hexyl-3-methylimidazolium), a 1,2,3-trialkylimidazolium (e.g., 1-butyl-2,3-dimethylimidazolium), a 1,3-dialkylpyrimidinium, an N-alkylpyridinium (e.g., N-octylpyridinium), an N-alkylisoquinolinium, an N-alkylpyrrolium, an N,N-dialkylpyrrolidinium (e.g., 1-methyl-1-propylpyrrolidinium, 1-methyl-1-butylpyrrolidinium and/or 1-methyl-1-octylpyrrolidinium), and N,N-dialkyl piperidinium (e.g., 1-methyl-1-propylpiperidinium, 1-methyl-1-butylpiperidinium and/or 1-methyl-1-octylpiperidinium); and/or an anion such as bis(trifluoromethylsulfonyl)imide ("bistriflimide"), tetrafluoroborate, hexafluorophosphate and/or halide; and/or any combinations thereof.

Examples of ionic liquids suitable for an alkali metal ion battery (e.g., an alkali metal ion sulfur battery) include, without limitation:

1-ethyl-3-methylimidazolium salts such as 1-ethyl-3-methylimidazolium bis(trifluoromethylsulfonyl)imide and 1-ethyl-3-methylimidazolium tetrafluoroborate;

1-butyl-3-methylimidazolium salts such as 1-butyl-3-methylimidazolium bis(trifluoromethylsulfonyl)imide and 1-butyl-3-methylimidazolium tetrafluoroborate;

1-hexyl-3-methylimidazolium salts such as 1-hexyl-3-methylimidazolium bis(trifluoromethylsulfonyl)imide and 1-hexyl-3-methylimidazolium tetrafluoroborate;

1-butyl-2,3-dimethylimidazolium salts such as 1-butyl-2,3-dimethylimidazolium bis(trifluoromethylsulfonyl)imide and 1-butyl-2,3-dimethylimidazolium tetrafluoroborate;

N-octylpyridinium salts such as N-octylpyridinium tetrafluoroborate;

N-butyl-4-methylpyridinium salts such as N-butyl-4-methylpyridinium tetrafluoroborate and N-butyl-4-methylpyridinium hexafluorophosphate;

1-methyl-1-propylpyrrolidinium ([MPPyrro]$^+$) salts;
1-methyl-1-butylpyrrolidinium ([MBPyrro]$^+$) salts;
1-methyl-1-propylpiperidinium ([MPPip]$^+$) salts;
1-methyl-1-butylpiperidinium ([MBPip]$^+$) salts;
1-methyl-1-octylpyrrolidinium ([MOPyrro]$^+$) salts; and
1-methyl-1-octylpiperidinium ([MOPip]$^+$) salts.

According to some embodiments of any one of the embodiments described herein, the composition-of-matter is in a form of a powder, and the powder is attached by a binder to a current collector, thereby forming an electrode (e.g., an anode).

According to another aspect of embodiments of the invention, there is provided a rechargeable alkali metal ion battery comprising at least one electrochemical half cell according to any of the respective embodiments described herein. The battery may comprise any number of electrochemical cells, of which some or all comprise at least one electrochemical half cell according to any of the respective embodiments described herein. In some embodiments, the battery comprises at least one electrochemical cell comprising an electrochemical half cell according to any of the respective embodiments described herein, wherein the electrochemical half cell described herein comprises an anode of the electrochemical cell.

Herein, the phrase "alkali metal ion battery" refers to a battery (e.g, comprising one or more electrochemical cells) wherein an electrochemical reaction which provides at least a portion of the electric power generated by the battery comprises movement of an alkali metal ion from one electrode (e.g., an anode) to another electrode (e.g., a cathode).

Herein, the phrase "rechargeable alkali metal ion battery" refers to an alkali metal ion battery (as defined herein) designed and/or identified for re-use upon recharging the battery by application of a suitable electric potential.

According to some embodiments of any one of the embodiments described herein, the rechargeable alkali metal ion battery comprises at least one electrochemical half cell described herein comprising an anode which comprises a composition-of-matter described herein, and an alkali metal ion cathode (e.g., any cathode known in the art to be suitable for an alkali metal ion battery). The battery may comprise any number of electrochemical cells, of which some or all comprise at least one electrochemical half cell according to any of the respective embodiments described herein.

According to some embodiments, the alkali metal is lithium and the cathode comprises a lithium-containing substance (e.g., such as known in the art to be suitable for an alkali metal ion battery), for example, lithium iron phosphate, lithium cobalt oxide, lithium nickel oxide, lithium manganese oxide, lithium nickel manganese cobalt oxide, lithium nickel cobalt aluminum oxide and/or lithium titanate.

According to some embodiments of any one of the embodiments relating to any one of the batteries described herein, when a battery and the cathode of the battery is in a fully charged state (e.g., the cathode contains none of its alkali metal cations), an amount of the alkali metal in an anode of the battery is at least 50% of a capacity of the anode (e.g., the anode capacity being the difference between an amount of alkali metal upon maximal absorption of the alkali metal by the anode composition-of-matter, as described herein, and the amount of alkali metal (optionally zero) in the fully discharged state of the anode). In some embodiments, an amount of the alkali metal in an anode of the battery is at least 60% of a capacity of the anode. In some embodiments, an amount of the alkali metal in an anode of the battery is at least 70% of a capacity of the anode. In some embodiments, an amount of the alkali metal in an anode of the battery is at least 80% of a capacity of the anode. In some embodiments, an amount of the alkali metal in an anode of the battery is at least 90% of a capacity of the anode. In some embodiments, an amount of the alkali metal in an anode of the battery is at least 95% of a capacity of the anode. In some embodiments, an amount of the alkali metal in an anode of the battery is at least 98% of a capacity of the anode. In some embodiments, an amount of the alkali metal in an anode of the battery is at least 99% of a capacity of the anode.

Herein, the phrase "fully charged state" refers to a state of a battery and/or electrodes of a battery, wherein an anode is characterized by maximal absorption of the alkali metal (as described herein) and a cathode is characterized by a minimal amount of the alkali metal cations (as described herein) for a given set of conditions, e.g., a second form of a substance (as described herein), wherein the conditions are such as those within the battery during normal operation of the battery.

Herein, the phrase "fully discharged state" refers to a state of a battery and/or electrodes of a battery, wherein an anode is characterized by minimal amount of the alkali metal cations (as described herein) for a given set of conditions, e.g., a second form of a substance (as described herein), and a cathode is characterized by maximal absorption of the alkali metal cations (as described herein) for a given set of conditions, wherein the conditions are such as those within the battery during normal operation of the battery.

Herein, conditions of "normal operation of the battery" optionally comprise a temperature of 25° C., and a closed circuit allowing current to flow from the battery anode to the battery cathode, for example, at a discharge rate of 1 ampere.

According to some embodiments, in any one of the batteries described herein, when a battery and the cathode of the battery is in a fully discharged state, an amount of the alkali metal in an anode of the battery is no more than 50% of a capacity of the anode (e.g., the anode capacity being the difference between an amount of alkali metal upon maximal absorption of the alkali metal by the anode composition-of-matter, as described herein, and the amount of alkali metal (optionally zero) in the fully discharged state of the anode). In some embodiments, an amount of the alkali metal in an anode of the battery is no more than 40% of a capacity of the anode. In some embodiments, an amount of the alkali metal in an anode of the battery is no more than 30% of a capacity of the anode. In some embodiments, an amount of the alkali metal in an anode of the battery is no more than 20% of a capacity of the anode. In some embodiments, an amount of the alkali metal in an anode of the battery is no more than 10% of a capacity of the anode. In some embodiments, an amount of the alkali metal in an anode of the battery is no more than 5% of a capacity of the anode. In some embodiments, an amount of the alkali metal in an anode of the battery is no more than 2% of a capacity of the anode. In some embodiments, an amount of the alkali metal in an anode of the battery is no more than 1% of a capacity of the anode.

According to some embodiments of any one of the embodiments described herein, the capacity of the anode is about 100% of the capacity of the cathode, such that all or nearly all of the alkali metal released from the anode (e.g., during discharge of the battery) can be absorbed by the cathode, and all or nearly all of the alkali metal released from the cathode (e.g., during recharging of the battery) can be absorbed by the anode.

Preparation:

According to another aspect of embodiments of the invention, there is provided a process for preparing a composition-of-matter (e.g., according to any of the respective embodiments described herein) comprising a plurality of particles, the particles comprising a compound or element (e.g., other than an alkali metal) which forms an alloy with the alkali metal; and/or an alloy of the alkali metal with the compound or element, the alloy reversibly releasing an alkali metal (as defined herein), wherein in at least a portion of the particles, each particle is being encapsulated within a volume enclosed by a shell or matrix which conducts cations of the alkali meta described herein, the process comprising:

i) providing particles comprising the alloy described herein, wherein the alloy is saturated with the alkali metal (e.g., in accordance with any one of the respective embodiments described herein); and ii) coating the particles with a conductor of cations of the alkali metal, the conductor of cations optionally being further capable of conducting electrons (e.g., an electron-ion conductor, in accordance with any one of the respective embodiments described herein), thereby forming the shell or matrix.

A conductor of cations of the alkali metal, which is further capable of conducting, or which conducts, electrons, may optionally comprise at least one compound capable of conducting, or which conducts, both the cations and electrons (a compound which is an electron-ion conductor). Alternatively or additionally, the conductor is a substance comprises a combination of at least one compound which is an electron conductor capable of conducting, or which conducts, the cations with at least one compound which is an electron conductor.

Herein, the phrase "saturated with the alkali metal" refers to an alloy having at least an amount of alkali metal as is present in the alloy upon maximal absorption of the alkali metal, as described herein.

According to some embodiments of any one of the embodiments described herein, the coating comprises:

mixing the particles comprising the alloy with particles of a conductor of cations of the alkali metal (i.e., particles comprising an ion conductor described herein) and optionally further capable of conducting electrons, and optionally with additional particles of an electron conductor (i.e., particles comprising an electron conductor described herein, which are in addition to the aforementioned particles of a conductor of cations), to obtain a mixture; and subjecting the mixture to a heat treatment, to thereby form the shell or matrix.

According to some embodiments of the invention, the heat treatment effects sintering of particles in the mixture. In some embodiments, the heat treatment effects sintering of particles of a conductor of cations of the alkali metal (e.g., according to any of the respective embodiments described herein) and/or particles of an electron conductor (e.g., according to any of the respective embodiments described herein) with each other. Additionally or alternatively, in some embodiments, the heat treatment effects sintering of particles of a conductor of cations of the alkali metal (e.g., according to any of the respective embodiments described herein) and/or particles of an electron conductor (e.g., according to any of the respective embodiments described herein) with particles comprising the alloy (e.g., according to any of the respective embodiments described herein).

According to some embodiments of the invention, the sintering is effected by heating for at least 1 hour. In some embodiments, the sintering is effected by heating for 1 to 50 hours. In some embodiments, the sintering is effected by heating for 2 to 10 hours.

According to some embodiments of the invention, the sintering is effected at a temperature of no more than (i.e., not higher than a temperature that is) 10° C. lower than a melting point of the conductor of cations of the alkali metal. In some embodiments, the temperature is no more than (i.e., not higher than a temperature that is) 50° C. lower than the melting point. In some embodiments, the temperature is no more than (i.e., not higher than a temperature that is) 100° C. lower than the melting point. In some embodiments, the temperature is no more than (i.e., not higher than a temperature that is) 300° C. lower than the melting point.

According to some embodiments of the invention, the sintering is effected at a temperature in a range of from 100 to 400° C., optionally for at least one hour (e.g., from 1 to 50 hours), optionally for 2 to 10 hours.

According to some embodiments of the invention, the heat treatment effects melting of the particles of a conductor of cations of the alkali metal and/or particles of an electron conductor, but not melting of the particles comprising the alloy.

According to some embodiments of the invention, the heat treatment comprises heating to a temperature above a melting point of at least one ion conductor and/or electron conductor in the conductor of cations of the alkali metal and below a melting point of the alloy.

According to some embodiments of the invention, the shell or matrix is formed (e.g., by heat treatment according to any of the respective embodiments described herein) from particles characterized by a width in a range of from 0.5 to 100 nm, optionally from 0.5 to 25 nm, and optionally from 1 to 20 nm, according to any of the respective embodiments described herein. In some embodiments, the process comprises grinding the ingredients of the shell or matrix to form particles of such a size.

According to some embodiments of the invention, the process comprises forming particles according to any of the respective embodiments described herein (e.g., particles comprising the alloy and/or particles for forming the shell or matrix) by ball-milling.

According to some embodiments of the invention, the process further comprise grinding the composition-of-matter (e.g., after a heat treatment according to any of the respective embodiments described herein) to form a powder (e.g., a powder according to any of the respective embodiments described herein), optionally by ball-milling.

According to some embodiments of any one of the embodiments described herein, the composition-of-matter (e.g., in the form of a powder, according to any of the respective embodiments described herein) is attached to a current collector to form an electrode, optionally using a suitable binder (e.g., a binder used in the art for forming electrodes) and optionally together with carbon powder.

According to some embodiments of any one of the embodiments described herein, the composition-of-matter is subjected to conditions which cause release ("discharge") of at least a portion of the alkali metal in the alloy (e.g., such that the alloy reversibly releasing an alkali metal is no longer saturated with the alkali metal). In some embodiments, this step is performed after attaching the composition-of-matter to a current collector, e.g., to form an electrode as described herein. Optionally, the conditions comprise an electric potential and contact with a liquid (e.g., a liquid comprising an electrolyte, as described herein) which induces release of alkali metal ions from the alloy into the liquid, for example, upon oxidation of alkali metal atoms in the alloy to form alkali metal ions released into the electrolyte.

The amount of alkali metal to be released is optionally controlled (e.g., by controlling the conditions which cause release and/or the time during which the composition-of-matter is subjected to such conditions) so as to obtain an electrode with an alkali metal content compatible with the alkali metal content of another electrode, optionally for assembling an electrochemical cell (e.g., in a rechargeable battery such as described herein) from the electrodes. For example, when one electrode is in a state of maximal absorption of the alkali metal, the other electrode is preferably substantially free of the alkali metal (e.g., as described herein); and when one electrode is partially (e.g., about 50%) discharged, the other electrode is preferably partially (e.g., about 50%) discharged.

According to another aspect of embodiments of the invention, there is provided a composition-of-matter prepared by a process according to any of the embodiments described herein relating to a process.

It is expected that during the life of a patent maturing from this application many relevant battery components and designs will be developed and the scope of the terms "anode", "cathode", "electrolyte", "battery", "electrochemical half cell" and the like are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Preparation of Exemplary Anodes Comprising Encapsulated Li/Si Alloy

Ball-milling of mixed ionic electronic conductor materials for a shell or cage matrix (referred to herein as "matrix material") was performed for 12-20 hours (at 450 rotations per minute) using a hermetically sealed tungsten carbide jar. Mixed ionic electronic conductor materials included ion (lithium) conductors (such as $Li_2CO_3$, $Li_2SO_4$, LiF and $Li_4Ti_5O_{12}$), electronic conductors (such as Ni nanoparticles), electron-ion conductors (such as $MoS_2$) and dopants (such as $CaF_2$). $Al_2O_3$ was also included in some matrix materials, for enhancing mechanical strength and/or cation conduction.

High energy ball-milling of silicon nanoparticles and lithium as electrochemically active core materials, along with Ni nanoparticles or $MoS_2$ (BP2000™) powder, was performed for 4-24 hours (at 600 rotations per minute) in order to produce a Li/Si alloy.

The matrix material and the Li/Si alloy were then mixed by ball-milling for 4-24 hours (at 450 rotations per minute) at an 80:20 or 70:30 weight ratio of Li/Si to matrix material. The samples were then sintered for 2 hours at 350° C. under an inert atmosphere, forming a mixed conductor matrix encapsulating Li/Si alloy. Table 1 described the composition and preparation of exemplary mixed conductor matrices and encapsulated Li/Si alloys.

The anode ink was coated on a 25 μm thick copper foil; electrodes were dried at 100° C. for a few hours in order to fully evaporate the solvent from the coating. The anode was tested by using 1 M $LiPF_6$ in 1:1 EC:DEC (ethylene carbonate:diethylcarbonate) electrolyte. Other electrolytes, such as carbonates containing fluoroethylene carbonate (FEC) and others based on ionic liquids were also used.

Coin cells were fabricated with a porous polypropylene separator (Celgard® 2400), and a lithium metal foil was used as an anode. Electrochemical measurements were carried out using a Bio-Logic EC-Lab instrument. The cells were cycled at constant current at room temperature.

Figure 4:
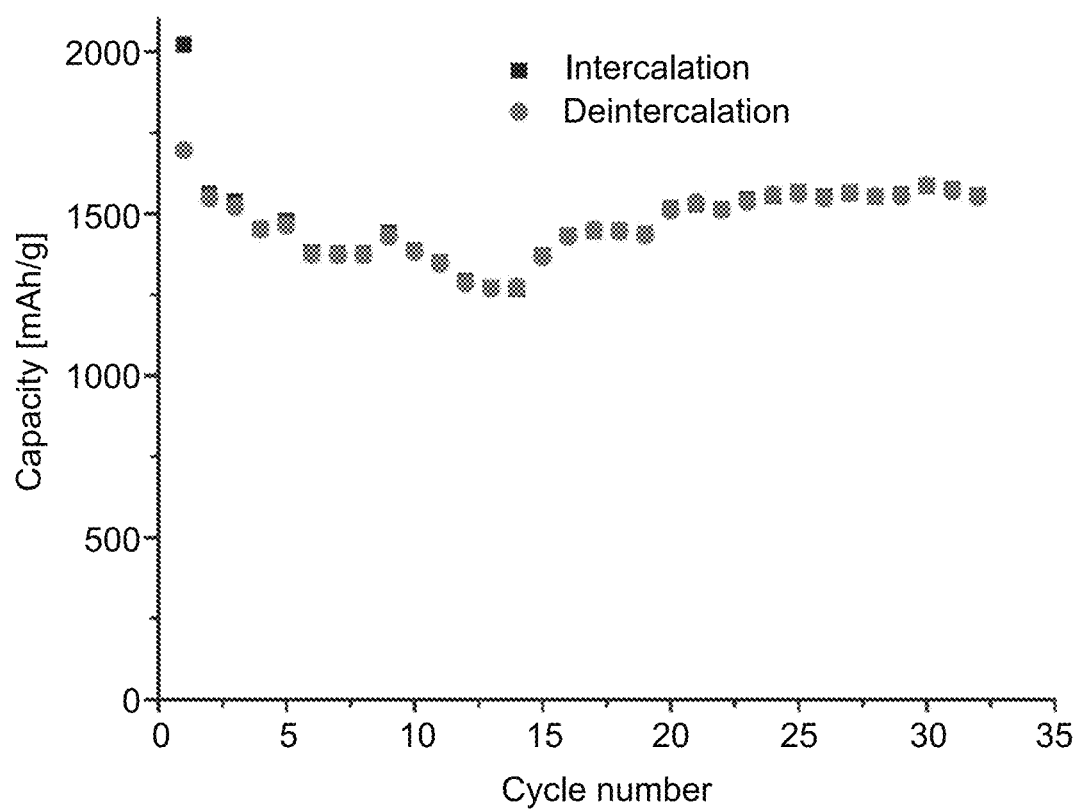
FIG. 4 is a graph showing the capacity of an exemplary Li/Si-containing anode over the course 30 cycles of lithium intercalation and de-intercalation, using a voltage range of 0.03-1 V and a current density of 0.05 mA/cm$^2$.

As shown in FIG. 4, the capacity of an exemplary Li/Si-containing anode (prepared using the LSCS-2 powder described in Table 1) was largely maintained over the course of 30 cycles.

TABLE 1 composition (weight percents) and preparation of exemplary mixed conductor matrices and encapsulated Li/Si alloys.

| | LSCS-1 | | | LSCS-2 | | | LSCS-3 | | |
|---|---|---|---|---|---|---|---|---|---|
| Sample | Li/Si | Matrix | 80% Li/Si + 20% matrix | Li/Si | Matrix | 80% Li/Si + 20% matrix | Li/Si | Matrix | 70% Li/Si + 30% matrix |
| Composition | | | | | | | | | |
| Li | 42 | | 33.6 | 42 | | 33.6 | 48 | | 33.6 |
| Si | 56 | | 44.8 | 56 | | 44.8 | 48 | | 33.6 |
| $MoS_2$ | | 14 | 2.8 | | | | 4 | 10 | 2.8 + 3 |
| Ni | 2 | | 1.6 | 2 | 5 | 1.6 + 1 | | | |
| $Li_2SO_4$ | | | | | 40 | 8 | | | |
| LiF | | 80 | 16 | | 55 | 11 | | | |
| $CaF_2$ | | 3 | 0.6 | | | | | | |
| $Al_2O_3$ | | 3 | 0.6 | | | | | | |
| $Li_4Ti_5O_{12}$ | | | | | | | | 90 | 27 |
| Ball-milling conditions | | | | | | | | | |
| Ball diameter | 10 mm + 5 mm | 10 mm | 10 mm + 5 mm | 10 mm + 5 mm | 10 mm + 5 mm | 10 mm + 5 mm | 10 mm + 5 mm | 10 mm + 5 mm | 10 mm + 5 mm |
| Solvent | none | hexane | hexane | heptane | heptane | heptane | none | none | heptane |
| Time [hours] | 12 | 4 | 6 | 12 | 24 | 24 | 20 | 4 | 4 |
| Rotations per minute | 600 | 450 | 450 | 600 | 450 | 450 | 600 | 450 | 450 |

Ball milling was performed using hexane or heptane as solvent or without a solvent, and used 5 balls with a 10 mm diameter and 30 balls with a 5 mm diameter, unless indicated otherwise.

The obtained powder was then used to fabricate anodes for electrochemical measurements. All assembly steps were performed in an argon-filled glove box.

Anode ink (in the form of a paste) was prepared with different binders, such as polyvinylidene difluoride (PVdF), poly(styrene-co-butadiene) rubber (SBR) and poly(acrylic acid) (PAA), dissolved in cyclopentanone (for PVDF) or toluene (for SBR and PAA). A desired amount of the anode powder (prepared as described hereinabove) was added to the dissolved binder solution and stirred overnight with the use of a magnetic stirrer. The weight percent of the binder was 5-15% of all solids. 5-20 weight percents of carbon were added to the suspension in order to improve the electronic conductivity of the paste. In some cases, up to 10 weight percents carbon nanotubes or carbon nanowires were also added. The weight ratio of all solids to solvent was about 1:6 to 1:12.

XPS (x-ray photoelectron spectroscopy) measurements were performed in order to ascertain the structure of the sintered LSCS-2 anode powder.

Figure 5:
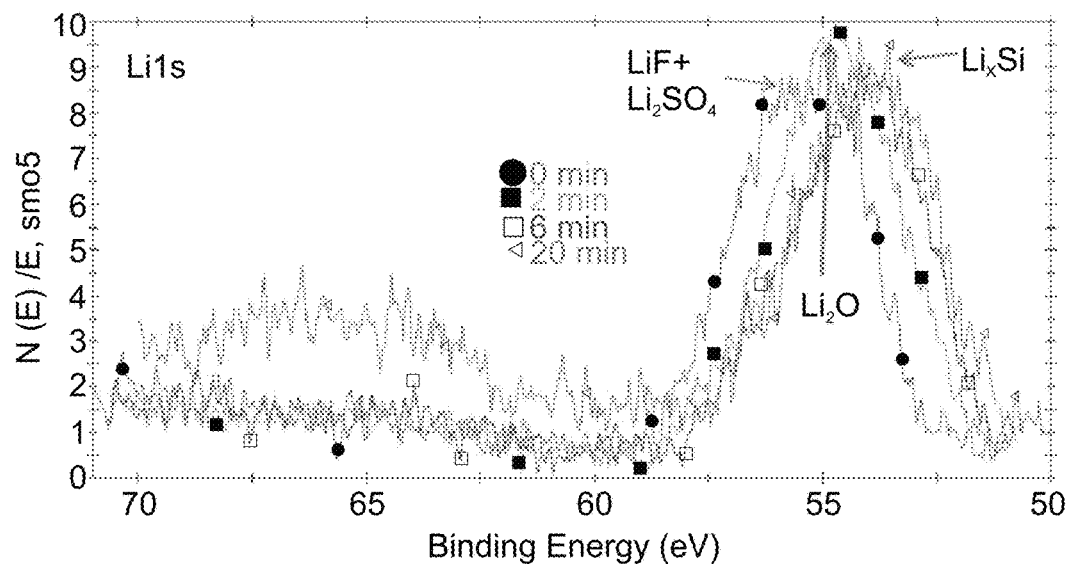
FIG. 5 is an X-ray photoelectron spectrum of an exemplary composition-of-matter showing peaks corresponding to LiF, $Li_2SO_4$, $Li_2O$ and Li/Si alloy ($Li_xSi$) after 0, 2, 6 or 20 minutes of sputtering.

As shown in FIG. 5, XPS analysis showed a lithium salt (LiF and $Li_2SO_4$) signal and lithium oxide signal which decrease gradually, followed by a gradually increasing Li/Si signal.

Figure 6:
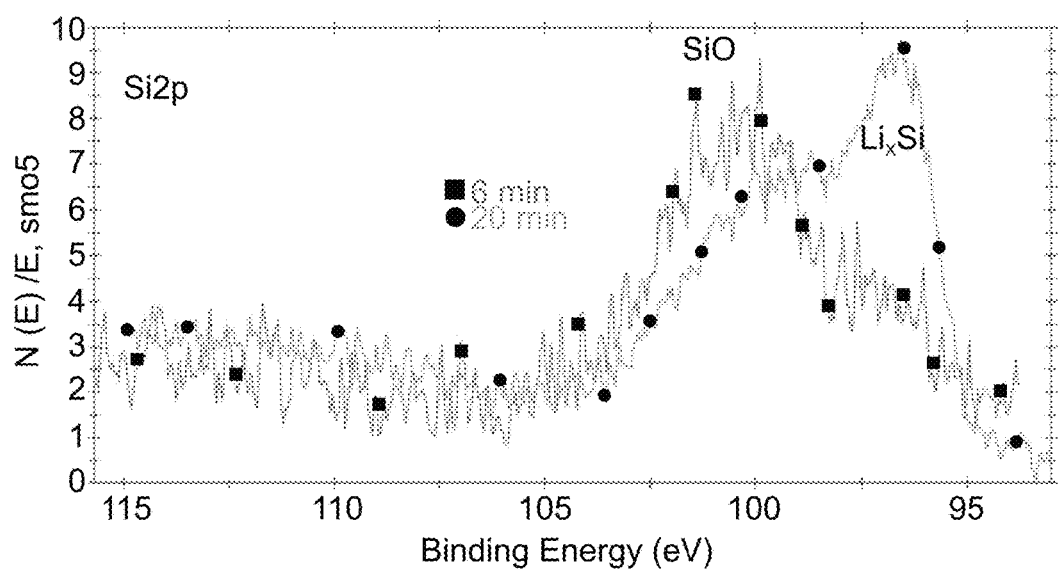
FIG. 6 is an X-ray photoelectron spectrum of an exemplary composition-of-matter showing peaks corresponding to silicon dioxide ($SiO_2$) and Li/Si alloy ($Li_xSi$) after 6 or 20 minutes of sputtering.

Furthermore, as shown in FIG. 6, XPS analysis showed a silicon oxide signal which decreases gradually, followed by a gradually increasing Li/Si signal.

These results indicate that Li/Si alloy is encapsulated by a thin shell layer comprising the lithium salts of the matrix material and lithium and silicon oxides, and that the Li/Si alloy is protected from the effects of volumetric expansion during cycling.

Example 2

Exemplary General Procedures for Preparing Anodes Comprising Encapsulated Alkali Metal Alloy Ball-milling of the ionic conductor materials and/or electronic conductor materials for a shell or cage matrix (referred to herein as "matrix material") is performed. This may optionally be done separately for each material, in a single step, or in several steps, in order to reach the desired particle size for each material. Ball-milling is optionally performed using a hermetically sealed tungsten carbide jar.

The electronic conductors optionally comprises carbon nanoparticles, such as, without limitation, carbon black, graphite, carbon nanotubes, graphene and/or graphene oxide; and/or metal nanoparticles, such as, without limitation, nanoparticles of Ni, Sn, Co and/or Fe and mixtures thereof.

The ionic (e.g., lithium cation) conductor materials optionally comprise lithium salts, such as, without limitation, $Li_2CO_3$, $Li_2SO_4$, LiF and/or mixtures thereof; lithiated metal sulfides, preferably fully lithiated metal sulfides, such as, without limitation, $LiTiS_2$, LiCuS, $LiCoS_2$, and/or $LiFeS_2$; fully lithiated metal oxides, such as, without limitation, oxides of Ti, Ni, Co, Mn, Fe and/or mixtures thereof (e.g., $Li_4Ti_5O_{12}$, $LiNi_{0.33}Co_{0.33}Mn_{0.33}$, $LiFePO_4$). Some of these materials, such as $LiTiS_2$, LiCuS, $LiCoS_2$, and $LiFeS_2$, are both electronic and ionic conductors. Ion conductive polymers such as lithiated Nafion can also be used. When using sodium anode materials, sodium compounds are used instead of the corresponding lithium compounds, for example, $Na_2SO_4$ and NaF may be used (e.g., instead of $Li_2SO_4$ and LiF). The ball-milling may be wet or dry, optionally performed from 0.1 to 72 hours, and optionally at a frequency of from 100 to 1000 rotations per minute.

High energy ball-milling of the electrochemically active core materials is performed. The core materials including an alkali metal (M), such as lithium, sodium and/or potassium, and another element (A), such as, without limitation Si, Al, Sb and/or Sn, in order to produce a compound having the formula $M_xA$ (e.g., $M_xSi$, $M_xAl$, $M_xSb$ or $M_xSn$ alloy). For lithium/silicon it is preferable that the alloy have a Li/Si molar ratio of from 1:1 (LiSi) to 4.4:1 ($Li_{4.4}Si$). The ball-milling may be wet or dry, optionally performed from 2 to 72 hours, and optionally at a frequency of from 100 to 1000 rotations per minute. Various materials may optionally be added to the alloy for co-milling, for example, carbon material (optionally up to 50%), an electronic conductor described hereinabove (optionally up to 30%) and/or a material described hereinabove which is both an electronic conductor and an ionic conductor (optionally up to 30%).

It is preferable that the final size of the matrix material particles is smaller than that of the alkali metal alloy particles.

The alkali metal alloy (core) particles and matrix materials are then mixed by any suitable method, optionally high energy ball-milling, at a core to shell ratio in a range of from 100:1 to 1:1 (optionally, from 20:1 to 4:1). The ball-milling may be wet or dry, optionally performed from 0.1 to 12 hours, and optionally at a frequency of from 100 to 1000 rotations per minute.

Heat treatment is then optionally applied to the mixed powders in an inert environment, for sintering of all the materials or for melting the matrix materials without melting the alkali metal alloy, thereby achieving a non-porous homogeneous shell or matrix. Heat treatment is optionally applied at a temperature of 70-800° C., optionally for up to a few hours, depending on the matrix material composition and desired outcome.

In some cases the samples are not sintered, as the ball-milling binds all of the materials together.

After cooling to room temperature, the heat-treated sample is optionally ground to reclaim a powder form with particles having an average size between 0.1 to 20 microns, preferably from 0.3 to 5 microns.

The obtained powder may then be used to fabricate anodes for electrochemical measurements, optionally in an argon-filled glove box.

Anode ink (e.g., paste) is prepared with different binders, such as polyvinylidene difluoride (PVdF), poly(styrene-co-butadiene) rubber (SBR) and poly (acrylic) acid (PAA), dissolved in cyclopentanone (for PVDF) or toluene (for SBR and PAA). Other binders such as, without limitation, polyethylene oxide, alginic acid, alginates, poly(vinyl alcohol), carboxymethylcellulose may be used. A desired amount of the anode powder comprising the alkali metal alloy is added to the dissolved binder solution. The weight percent of the binder is optionally 5-15% of all solids. Optionally, 5-20% weight percents of carbon is added to the suspension in order to improve the electronic conductivity of the paste. Optionally, up to 10% carbon nanotubes or carbon nanowires are added. The weight ratio of all solids to solvent is optionally about 1:6 to 1:12. The anode ink may then be coated on an anode material (e.g., copper) and dried to evaporate the solvent from the coating.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A process of preparing a composition-of-matter comprising a plurality of particles, said particles comprising a substance selected from the group consisting of:
   a) a compound which forms an alloy with an alkali metal; and
   b) said alloy of said alkali metal with said compound,
   said alloy reversibly releasing said alkali metal while decreasing in volume and absorbing said alkali metal while increasing in volume, wherein each of said particles is encapsulated within a volume enclosed by a shell or matrix which conducts cations of said alkali metal, the process comprising:
   i) providing particles comprising said alloy of an alkali metal with said compound, wherein said alloy is saturated with said alkali metal; and
   ii) coating said particles with a conductor of cations of said alkali metal, thereby forming said shell or matrix, wherein said coating comprises:

mixing said particles comprising said alloy with particles of said conductor of cations of said alkali metal, and optionally with additional particles of an electron conductor, to obtain a mixture; and subjecting said mixture to a heat treatment, said heat treatment effecting sintering of particles in said mixture by heating for at least 1 hour at a temperature of no more than 10° C. lower than a melting point of said conductor of cations of said alkali metal, to thereby form said shell or matrix.

2. A composition-of-matter comprising a plurality of particles, said particles comprising a substance selected from the group consisting of:
   a) a compound which forms an alloy with an alkali metal; and
   b) said alloy of said alkali metal with said compound,
   said alloy reversibly releasing said alkali metal while decreasing in volume and absorbing said alkali metal while increasing in volume, wherein each of said particles is encapsulated within a volume enclosed by a shell or matrix which conducts cations of said alkali metal, wherein a volume of said alloy upon maximal absorption of said alkali metal does not exceed said volume enclosed by a shell or matrix, and wherein said shell or matrix is substantially free of pores of at least 2 nm in diameter.

3. The composition-of-matter of claim 2, wherein a ratio of said volume of said alloy upon maximal absorption of said alkali metal to said volume enclosed by a shell or matrix is uniform among at least 90% of said particles.

4. The composition-of-matter of claim 2, wherein a volume of said alloy upon maximal absorption of said alkali metal is at least 80% of said volume enclosed by a shell or matrix.

5. The composition-of-matter of claim 2, wherein said shell or matrix which conducts cations of said alkali metal comprises an ion conductor comprising said alkali metal, said ion conductor being selected from the group consisting of a salt, a polymer electrolyte, a glass, a ceramic and any combination thereof.

6. The composition-of-matter of claim 5, wherein said ion conductor is selected from the group consisting of a carbonate salt of said alkali metal, a sulfate salt of said alkali metal, a fluoride salt of said alkali metal, a metal disulfide comprising said alkali metal, a metal oxide comprising said alkali metal, and a metal phosphate comprising said alkali metal, and any combination thereof.

7. The composition-of-matter of claim 5, wherein said ion conductor has a melting point lower than a melting point of said alloy upon maximal absorption of said alkali metal.

8. The composition-of-matter of claim 2, wherein said shell or matrix comprises at least one electron conductor.

9. The composition-of-matter of claim 2, wherein said compound which forms an alloy with an alkali metal is selected from the group consisting of silicon, tin, antimony, germanium, lead, bismuth, magnesium, aluminum and mixtures thereof.

10. The composition-of-matter of claim 9, wherein said alkali metal is lithium.

11. The composition-of-matter of claim 10, wherein said alloy upon maximal absorption of said alkali metal has a general formula selected from the group consisting of $Li_xSi$, wherein x is in a range of from 2.5 to 4.4; $Li_xSn$, wherein x is in a range of from 2.5 to 4.4; and $Li_xSb$, wherein x is in a range of from 1 to 3.

12. The composition-of-matter of claim 10, wherein said alloy upon maximal absorption of said alkali metal is selected from the group consisting of $Li_{4.2}Si$, $Li_{4.4}Sn$, $Li_3Sb$, $Li_{4.4}Ge$, $Li_{17}Pb_{83}$, $Li_3Bi$, $Li_{32.2}Sb_{31.8}Mn_{36}$, $Li_{4.4}Ge_{1-y}Sn_y$, wherein y is between 0 and 1.

13. The composition-of-matter of claim 2, wherein said shell or matrix is formed from particles characterized by an average size in a range of from 0.5 to 100 nm.

14. An electrochemical half cell comprising an anode which comprises the composition-of-matter of claim 2, and a liquid comprising an electrolyte.

15. The electrochemical half cell of claim 14, wherein said shell or matrix which conducts cations of said alkali metal is insoluble in said liquid comprising an electrolyte.

16. A rechargeable alkali metal ion battery comprising the electrochemical half cell of claim 14, and an alkali metal ion cathode.

17. The battery of claim 16, wherein when a cathode of the battery is in a fully discharged state, an amount of said alkali metal in an anode of the battery is no more than 50% of a capacity of said anode.

18. The process of claim 1, wherein said shell or matrix is formed from particles characterized by a width in a range of from 0.5 to 100 nm.

19. The process of claim 1, further comprising grinding said composition-of-matter to form a powder.

20. A composition-of-matter prepared by the process of claim 1.

* * * * *